United States Patent
Zudrell-Koch et al.

(10) Patent No.: US 8,803,450 B2
(45) Date of Patent: Aug. 12, 2014

(54) DIGITAL CONTROL CIRCUIT OF AN OPERATING DEVICE FOR LAMPS

(75) Inventors: Stefan Zudrell-Koch, Hohenems (AT); Guenter Marent, Bartholomaeberg (AT)

(73) Assignee: TridonicAtco GmbH & Co. KG, Dornbirn (AT)

( * ) Notice: Subject to any disclaimer, the term of this patent is extended or adjusted under 35 U.S.C. 154(b) by 487 days.

(21) Appl. No.: 12/530,769

(22) PCT Filed: Jan. 24, 2008

(86) PCT No.: PCT/EP2008/000550
§ 371 (c)(1),
(2), (4) Date: Sep. 24, 2009

(87) PCT Pub. No.: WO2008/116520
PCT Pub. Date: Oct. 2, 2008

(65) Prior Publication Data
US 2010/0052556 A1    Mar. 4, 2010

(30) Foreign Application Priority Data

Mar. 28, 2007  (DE) .......................... 10 2007 014 982
Mar. 30, 2007  (DE) .......................... 10 2007 015 508

(51) Int. Cl.
*H05B 37/02*   (2006.01)
*H05B 41/28*   (2006.01)
*H05B 41/282*  (2006.01)

(52) U.S. Cl.
CPC ............ *H05B 41/2828* (2013.01); *H05B 41/28* (2013.01); *Y02B 20/186* (2013.01)
USPC .......................................... 315/308; 315/291

(58) Field of Classification Search
CPC ............... H05B 41/2828; H05B 41/28; H05B 33/0815; H05B 41/2827; H05B 41/2855
USPC .............. 315/209 R, 291, 224–226, 246, 307
See application file for complete search history.

(56) References Cited

U.S. PATENT DOCUMENTS 4,698,554 A * 10/1987 Stupp et al. ................... 315/307
5,907,223 A    5/1999 Gu et al.
(Continued)

FOREIGN PATENT DOCUMENTS

EP    0871348 A1    10/1998
WO    WO-9528819 A1    10/1995

OTHER PUBLICATIONS

International Search Report for PCT/EP2008/000550 dated Apr. 25, 2008.

*Primary Examiner* — Jimmy Vu
*Assistant Examiner* — Amy Yang
(74) *Attorney, Agent, or Firm* — Marshall, Gerstein & Borun LLP (57) ABSTRACT

The invention relates to an integrated digital control circuit for an operating device for lamps, comprising: an output for the pulsing of switches of a half-bridge circuit having an adjustable frequency, wherein a load circuit comprising the lighting devices may be connected to the half-bridge circuit, an input, to which a signal may be selectively supplied, said signal reflecting the current through the half-bridge or the current through the lamp. The input is internally branched into two analysis branches, the outputs of which are combined using a logic member, the output of which is connected in turn to a controller for adjusting the frequency of the half-bridge actuating signal.

29 Claims, 8 Drawing Sheets

(56) References Cited

U.S. PATENT DOCUMENTS

| | | | |
|---|---|---|---|
| 6,002,215 A * | 12/1999 | Yamashita et al. | 315/308 |
| 6,011,358 A | 1/2000 | Knobloch et al. | |
| 7,378,805 B2 * | 5/2008 | Oh et al. | 315/291 |
| 7,414,371 B1 * | 8/2008 | Choi et al. | 315/291 |
| 7,541,745 B2 * | 6/2009 | Hopkins | 315/219 |
| 7,888,881 B2 * | 2/2011 | Shteynberg et al. | 315/291 |
| 2004/0085791 A1 * | 5/2004 | Lin et al. | 363/131 |
| 2011/0215729 A1 * | 9/2011 | Feldtkeller | 315/224 |

* cited by examiner

DIGITAL CONTROL CIRCUIT OF AN OPERATING DEVICE FOR LAMPS

BACKGROUND OF THE INVENTION

Field of the Invention

The present invention relates generally to the field of operating devices for lighting means. Typical examples are electronic ballasts for operating gas-discharge lamps, high pressure lamps, light-emitting diodes etc. It is generally the object of these operating devices to supply the associated lighting means with a supply voltage having an adapted voltage and/or frequency.

Related Technology

The invention relates in particular to operating devices having control units, to which measuring signals, which differ e.g. in dependence upon the configuration of the operating device, are supplied for the purpose of regulating the output of the connected lighting means. This can be applied in operating devices for fixed output or operating devices, in which the output of the lighting means is regulated to a fixedly adjusted or externally predeterminable value ("dimming"). For the purpose of this output regulation, a parameter which reproduces the output directly or indirectly is returned by a load circuit, which contains the lighting means, to a control unit. The control unit then compares this actual value with a desired value for the lighting means output. On the basis of this comparison, the control unit then adjusts a parameter which influences the lamp output and which in quite general terms can be e.g. the supply voltage and in particular the frequency and/or the duty cycle of the voltage applied at the lighting means, if the output characteristic curve of the lighting means is frequency-dependent. The output of light-emitting diodes can be effected e.g. preferably by means of PWM-control.

It is already known to use digital integrated circuits e.g. in the form of ASICs or microcontrollers for this type of regulating procedure.

Lighting means are known from the prior art, in which the output is controlled by the adjustment or of the frequency or of the duty cycle of the supply voltage of the lighting means. An example of this is the supply to lighting means via a half-bridge circuit which is connected between earth and a substantially constant supply voltage (bus voltage). A load circuit which contains the lighting means can then be connected e.g. at the centre point of two switches of the half-bridge voltage.

In the case of this embodiment, there are at least two options for determining the lighting means output:
- on the one hand, the current through the half-bridge can be detected, wherein in this case the lighting means output information is "encoded" in the average value with respect to time of this half-bridge current signal, or
- on the other hand, the current through the lighting means which are supplied with AC supply voltage can be detected, wherein in this case the output information is "encoded" by the peak values of the current through the lighting means (the average value of this signal is substantially zero).

SUMMARY OF THE INVENTION

Therefore, the invention provides a technology which renders it possible to design an operating device in terms of a platform approach such that it "adjusts" automatically to the respectively currently applied feedback signal without any external configuration.

Accordingly, the invention provides a control circuit for an operating device for lighting means, comprising an output for outputting a control signal for the lighting means operation, and an input for a signal, wherein the input is internally connected to at least two parallel evaluation branches, whose outputs can be supplied to a regulating module as an actual value signal, wherein the regulating module uses this actual value signal and a desired value to determine a control value and outputs it at the output of the control circuit as an actuating signal.

Further, the invention provides a control circuit for an operating device for lighting means, comprising an output for outputting a control signal for the lighting means operation, and an input for a signal, wherein the signal is processed internally in time division multiplexing and is then supplied to the regulating module as an actual value signal, and wherein in the time division multiplexing portions the signal is evaluated with the aid of different sets of criteria, wherein the regulating module uses this actual value signal and a desired value to determine a control value and outputs it at the output of the control circuit as an actuating signal.

Still further, the invention provides a control circuit for an operating device for lighting means, comprising an output for the pulsing of switches of a half-bridge circuit with an adjustable frequency and/or duty cycle, wherein a load circuit which contains the lighting means can be connected to the half-bridge circuit, and an input, to which optionally a signal which reproduces the current through the half-bridge, or a signal which reproduces the current through the lighting means can be supplied, wherein the input is connected internally to two evaluation branches, whose outputs are combined with a logic element, whose output is connected, in turn, to a control unit for adjusting the frequency of the half-bridge control signal.

The invention also provides an integrated digital control circuit for an operating device for lighting means, comprising an output for the pulsing of switches of a half-bridge circuit with an adjustable frequency, wherein a load circuit which contains the lighting means can be connected to the half-bridge circuit, and an input, to which optionally a signal which reproduces the current through the half-bridge, or a signal which reproduces the current through the lighting means can be supplied, wherein the input branches internally into two evaluation branches which each have a comparator, wherein different reference voltages are supplied to the two comparators.

The invention also provides an operation device for lighting means, and a light using the operating device.

Still further, the invention provides a method for operating an operating device for lighting meand, and methods and computer software for optionally regulating the output signal of lighting means.

In accordance with a first aspect of the invention, there is provided an integrated digital control circuit for an operating device for lighting means. The control circuit has an output for adjusting the lighting means operation. The control circuit has an input for a signal which reproduces the lighting means output. Different signal types which emanate e.g. starting from different regions of the operating device can be applied to this input depending upon the configuration of the operating device. In so doing, the digital integrated control circuit is formed in such a manner that the input is connected internally to at least two different evaluation branches, whose outputs are, in turn, combined. In turn, the output of the logic element is connected to a control unit.

Each of the several parallel evaluation branches thus performs the evaluation of the same signal, but with the aid of different sets of criteria. Each evaluation branch is thus allocated a set of criteria which analyses the signal with the aid of one or several criteria.

A further aspect of the invention relates to a control circuit for an operating device for lighting means, comprising an output for outputting a control signal for the lighting means operation, and an input for a signal, wherein the signal is processed internally in time division multiplexing and is then supplied to the regulating module as an actual value signal, wherein in the time division multiplexing portions the signal is evaluated with the aid of different sets of criteria, wherein the regulating module uses this actual value signal and a desired value to determine a control value and outputs it at the output of the control circuit as an actuating signal.

Preferably, the sets of criteria are selected such that for each potentially applied signal type only precisely one and only one set of criteria is fulfilled, so that one and precisely one evaluation branch thus makes a contribution to this actual signal feedback for regulation of the lighting means.

In a non-limiting exemplified embodiment of the invention, there is provided an integrated digital control circuit for an operating device for lighting means. The control circuit has an output for the purpose of pulsing switches of a half-bridge circuit with an adjustable frequency and/or an adjustable duty cycle, wherein a load circuit which contains the lighting means can be connected to the half-bridge circuit. The control circuit has an input for a signal which reproduces a function of the lighting means output. In so doing, this signal can optionally be a signal which reproduces the current through the half-bridge, or a signal which reproduces the current through the lighting means. In this example, one of these two signals is applied in a specific implementation. The digital integrated control circuit is formed in such a manner that the input is connected internally to two evaluation branches, whose outputs, in turn, are combined with a logic element. In turn, the output of the logic element is connected to a control unit for adjusting the frequency of the half-bridge control signal. Therefore, the frequency of the switches of the half-bridge is adjusted in dependence upon the output value of the logic element.

In particular, the two evaluation branches can each have a comparator. Different reference voltages can be supplied to the two comparators of the evaluation branches. The different reference voltages, to which the specifically applied signal is compared in parallel, are thus an example of different criteria, to which the same signal is subjected in parallel.

The logic element can be e.g. an OR-element.

The digital integrated circuit can be formed in particular as a microcontroller or preferably as an ASIC.

The first evaluation branch can be designed in such a manner that its output can assume two different logic states, if the signal at the input reproduces the half-bridge current, wherein in this case the output of the first evaluation branch then assumes only one logic value which is constant with respect to time, if a signal which reproduces the current through the lighting means is applied.

The signal reproducing the half-bridge current can be low pass-filtered externally and/or internally in the control circuit.

The first evaluation branch can have a comparator, whose output is connected to a duty cycle-evaluation unit. The duty cycle thus represents a further example of a criterion.

The second evaluation branch can be designed in particular such that its output can assume two different logic states, if the signal which reproduces the current through the lighting means is applied. In contrast, if the signal which reproduces the half-bridge current is applied at the input, the second evaluation branch assumes a constant logic value.

The second evaluation branch can have a comparator, whose output is connected to the logic element.

The control circuit can be formed for the purpose of adjusting, preferably increasing or decreasing, particularly preferably increasing or decreasing by one increment, the frequency of the half-bridge control signal in dependence upon the logic output value of the logic element.

Therefore, this can be e.g. a two-position regulator.

The invention also relates to operating devices for lighting means which have a control circuit of this type. Examples thereof are electronic ballasts for gas-discharge lamps, high pressure lamps or light-emitting diodes.

The invention also relates to a light which has lighting means and an operating device of the said type.

Finally, the invention also relates to methods for optionally regulating the output of lighting means in dependence upon a half-bridge current signal or a lighting means current signal.

BRIEF DESCRIPTION OF THE DRAWINGS

Further advantages, features and characteristics of the invention will now be explained with reference to the Figures of the accompanying drawings, in which.

DETAILED DESCRIPTION

The invention will now be explained with reference to FIG. 5, before exemplary embodiments are explained with reference to FIGS. 1 to 4.

Figure 5:
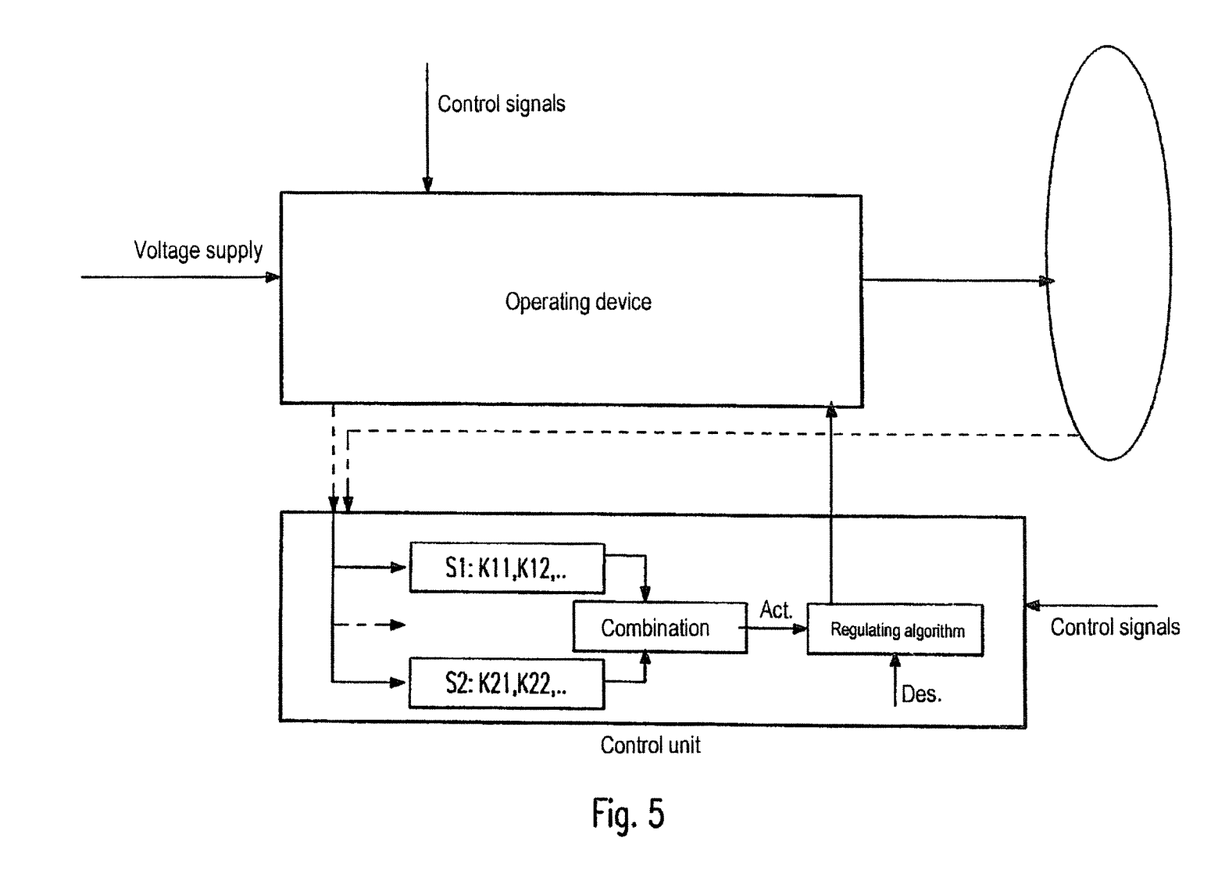
FIG. 5 shows a generalized illustration of the invention, according to which a feedback signal is subjected to different sets of criteria in parallel, before it is supplied to the regulating algorithm as an actual value.

FIG. 5 illustrates in general an operating device which is supplied with voltage and which supplies connected lighting means with power in a controlled manner and is itself supplied with voltage. A control unit is illustrated separately, although typically it is of course integrated into the operating device. The control unit receives at at least one input a measuring signal supplied from the operating device and/or the lighting means. The control unit has a regulating module, i.e. a module which on the basis of a supplied actual value signal and a desired value determines a control value with the aid of a regulating algorithm and outputs this control value to the operating device, so that the operating device carries out the operation of the lighting means accordingly.

External signals, e.g. for the purpose of desired value-adjustment can also optionally be supplied to the operating device and in particular to the control unit.

In accordance with the invention, the operating device and in particular the control unit does not have any a priori information which indicates which signal type is actually applied at the actual value input. In accordance with the invention, the control unit is formed for the purpose of determining the signal type independently even without any prior configuration. In accordance with the invention, no "identification preamble" is required in the signal for the purpose of determining the signal type, but the signal information itself is also used in addition to the real actual value evaluation for the purpose of "decoding" the signal type.

To this end, it is provided e.g. as illustrated in FIG. 5 that the measuring signal is supplied to at least two parallel evaluation branches. Each evaluation branch has a set S1, S2 of different criteria K11, K12 and K21, K22 respectively. The signal is thus subjected to different sets of criteria in parallel.

Alternatively or in addition, the signal can be processed internally in a serial manner and can be processed e.g. in time division multiplexing and can then be supplied to the regulating module as an actual value signal, wherein in the time division multiplexing portions the signal is evaluated with the aid of different sets of criteria.

For example, criteria can be the following:
Amplitude,
Duty cycle in a defined period,
Frequency components, etc.

It is established in advance which signal types are permissible for this type of control unit platform. The signal types differ e.g. in the manner in which they are tapped in the operating device or at the lighting means. For each permissible signal type, an evaluation branch is provided which is provided with a set of criteria which is unique for this signal type. Each set of criteria has one or preferably several criteria. The number of criteria can differ or can be the same from evaluation branch to evaluation branch.

Each set of criteria is unique for a signal type in the sense that when this signal type is applied only one evaluation branch makes a contribution (which varies with respect to time) as an actual value signal, whereas preferably all other evaluation branches make no contribution or a contribution which is constant with respect to time.

In the event of a change of the signal type applied at the input, the regulation thus changes instantaneously and without any reconfiguration, in that a different evaluation branch then automatically makes the contribution which varies with respect to time and which is decisive for the regulation.

Figure 1:
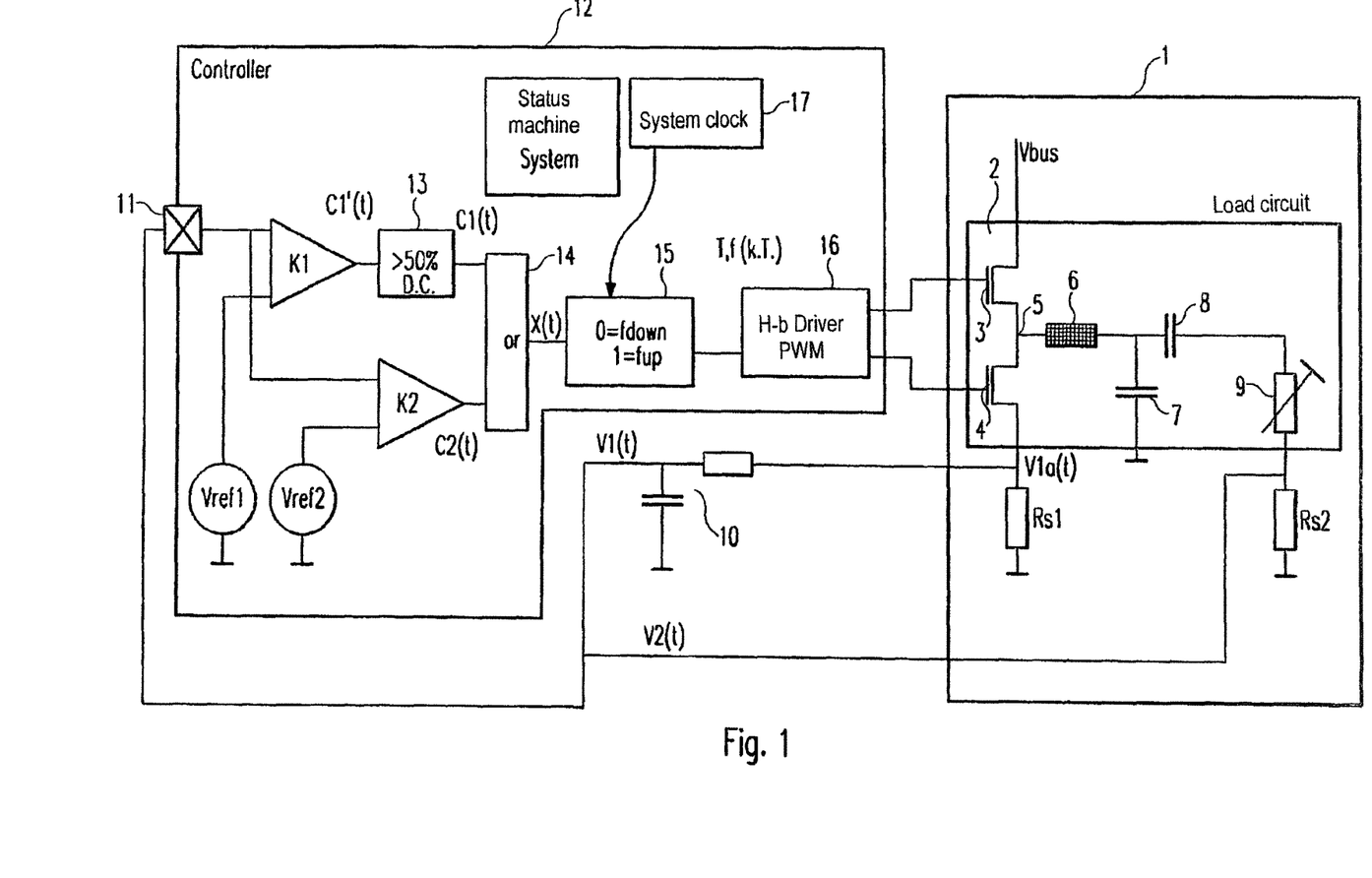
FIG. 1 shows a schematic view of a digital integrated control circuit (controller), to which a load circuit which contains lighting means is connected.

In FIG. 1, a load circuit is schematically referenced with the reference numeral 1. A substantially constant intermediate circuit voltage (bus voltage) $V_{bus}$ (optionally regulated to a desired value) is supplied to this load circuit 1, wherein this bus voltage is a DC voltage. More specifically, this bus voltage is supplied to a half-bridge circuit which is schematically referenced with the reference numeral 2 and comprises two alternately pulsed switches 3, 4. These switches 3, 4 are preferably MOSFETs.

The actual load circuit is coupled to the centre point 5 of the half-bridge circuit 2, wherein the load circuit comprises a series resonance circuit consisting of an inductor 6 and a capacitor 7 as well as a coupling capacitor 8.

Lighting means 9 are connected in parallel with the resonance capacitor 7 and can be e.g. a gas-discharge lamp, one or several high pressure lamps or light-emitting diodes. As illustrated schematically in FIG. 1, these lighting means can comprise in particular a frequency-dependent characteristic curve. The frequency of the supply voltage for the lighting means 9, which produces the half-bridge circuit based on the DC bus voltage, can be used to adjust the output of the lighting means 9.

If the lighting means do not have this frequency-dependent characteristic curve, as is the case e.g. with LEDs, the output can also be controlled by adjusting the duty cycle. (PWM-modulation).

FIG. 1 illustrates two options how the output of the lighting means 9 can be detected indirectly or directly. For this purpose, a parameter which reproduces the lighting means output directly or indirectly is fed back.

The first option is to tap a signal V1A(t) at a measuring resistor (shunt) RS1 which is preferably connected between the lower-potential switch 4 of the half-bridge circuit 2 and earth. This signal indirectly reproduces the output of the lighting means 9, as the bus voltage is substantially constant. The output information of this signal V1a(t) is found in its average value with respect to time, so that (in relation to the controller) an internal or external low-pass circuit 10 is provided, wherein the low-pass filtered half-bridge current circuit is designated by the reference V1(t).

An alternative way of detecting the output of the lighting means 9 is to detect the current through the lighting means 9 by means of a measuring resistor (shunt) Rs2 which is preferably connected between the lower-potential side lighting means 9 and earth.

This signal is designated hereinunder by the reference V2(t).

Of course, during the actual regulating operation, only one of the two signals V1(t) or V2(t) is used as an actual value for the lamp output.

However, the controller should now be able to perform the correct regulation of the lighting means output automatically without any external configuration (application of external configuration resistances, storing a value in a non-volatile memory etc.), irrespective of which of the two signals V1(t) or V2(t) is supplied to the same input 11 of the controller 12.

Since the controller 12 is designed preferably as an ASIC or microcontroller, thus in general terms as an integrated digital control circuit, the same controller 12 can be used as a platform in different devices, i.e. in particular devices which have any of the two actual signal feedbacks stated above.

In terms of hardware, the actual device can either be provided with only one of the two feedback branches of V1(t) or V2(t). Alternatively, both can be provided in terms of hardware, wherein in the meantime one of the branches is switched to inactive, e.g. by means of a break caused by the removal of an ohmic resistance.

In accordance with the invention, the controller 12 is thus now configured in such a manner that it automatically performs the correct output adjustment for the lighting means 9 as close as possible to a desired value irrespective of the type of actually fed back actual value signal to the input 11 of the controller 12, in that the controller correspondingly adjusts the frequency and/or the duty cycle of the switches of the half-bridge. As stated, it is necessary to take into account that these two signal types have encoded the output information differently, namely on the one hand in the average value with respect to time in the case of the half-bridge current and on the other hand in the form of the peak value range in the case of the lighting means current.

As shown in FIG. 1, in accordance with the invention two evaluation branches are connected to the input 11 in the controller 12.

The first evaluation branch which is responsible for the correct evaluation of the internally or externally low-pass filtered half-bridge current signal V1(t) has a comparator K1 and a duty cycle evaluation circuit 13. The comparator K1 is supplied on the one hand with the signal which is supplied to the input 11 of the controller 12 and which, as stated, can optionally be the signal V1(t) or V2(t). It is also supplied with a reference voltage $V_{ref1}$.

The duty cycle evaluation circuit 13 outputs a logic signal (e.g. 0 or 1), whose value depends upon whether the duty cycle of the output signal of the comparator K1 is greater or less than 50%.

The second evaluation branch has a comparator K2 which is supplied in turn with the input signal of the controller 12, which is applied to the input 11, and a reference voltage $V_{ref2}$. Preferably, the reference voltage of the second comparator K2 is different from the reference voltage $V_{ref1}$ of the first comparator K1.

The output signals of the two evaluation branches are connected via a logic element which can be e.g. an OR-element 14. In the embodiment of FIG. 1, the logic output signal of the duty cycle evaluation unit 13 on the one hand and the output signal of the comparator K2 on the other hand are supplied to the logic element 14.

The time-dependent output signal of the logic element 14 is now designated by the reference X(t) and is supplied to a unit 15 which converts the logic output value of the logic element 14 into a frequency parameter and/[or] duty cycle parameter for a half-bridge driver 16 which, in turn, controls the switches 3, 4 of the half-bridge 2.

Preferably, the frequency converter unit 15 outputs the information "Increase frequency" in a first logic state of the signal X(t), whereas in the respective other logic state of the signal X(t) the signal "Lower the frequency of the half-bridge" is output to the half-bridge driver 16. This information for the half-bridge driver is preferably the control of an incremental increase or decrease in the half-bridge operating frequency.

Therefore, this frequency converter unit 15 can be designed e.g. as a counter. During a switching period of the half-bridge driver 16, this counter integrates the applied input signal X(t), so that in the case of an applied input signal "1" the counter value is increased continuously in incremental fashion ("continuously" means with the frequency of the system clock 17), whereas in the case of an applied signal "logic 0" the counter status is decreased. Then, the counter is reinitialized in each case after a period of the half-bridge driver 16. In dependence upon this, at the end of a period of the half-bridge driver it is necessary to establish whether the value of the counter is above or below the initial value (which does not have to be zero).

Figure 4:
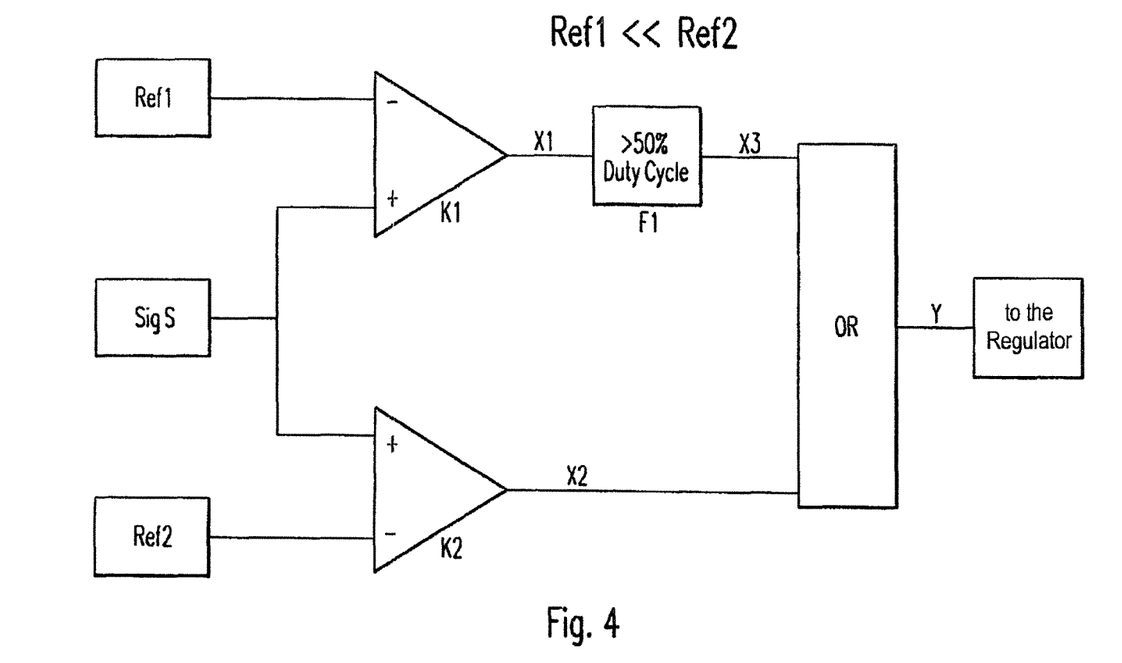
FIG. 4 shows finally a schematic view of the evaluation branches in the controller.

FIG. 4 illustrates in detail the connection of the comparators K1, K2 and the arrangement of the first and second evaluation branches. It should be emphasized once again that the inverted inputs of the comparators K1, K2 are preferably different from applied reference voltages preferably below $V_{ref1}$, $V_{ref2}$ and $V_{ref2}$ is preferably greater than $V_{ref1}$.

Figure 2:
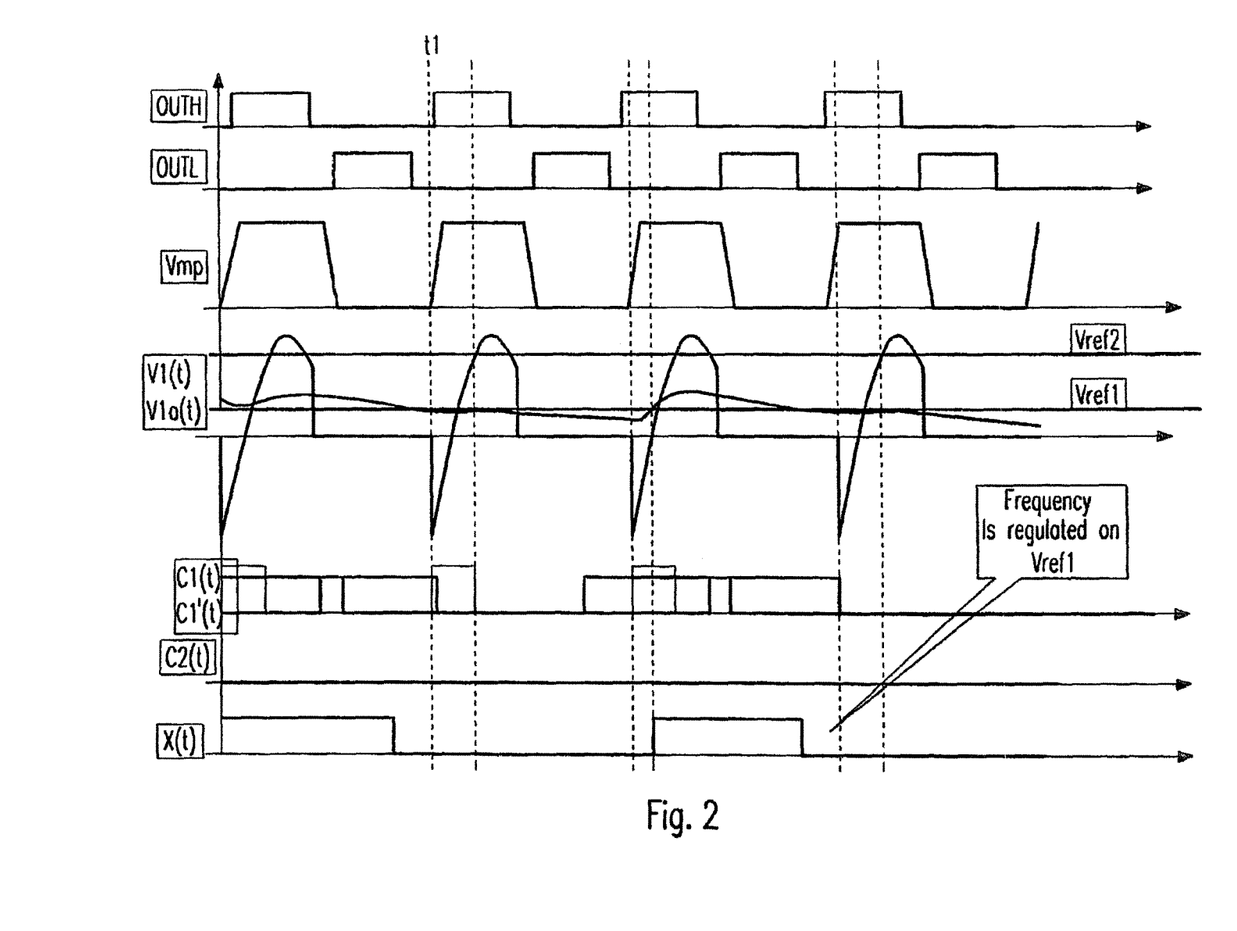
FIG. 2 shows signal progressions in the event that a signal which reproduces the half-bridge current is applied at the input of the controller.

By referring now to FIG. 2 it will be possible to explain the scenario where the signal V1(t), i.e. a half-bridge current signal, is applied at the input 11 of the controller 12.

The signals OutH and OutL designate the gate control signals of the higher-potential (OutH) switch 3 or of the lower-potential (OutL) switch 4. After switching on switch 3 and then switch 4 in alternating fashion, a period of the switching procedure of the half-bridge 2 is terminated, which is designated schematically by the time t1. $V_{MP}$ designates the centre point voltage, i.e. the voltage at the centre point 5, to which the load circuit is connected.

It is also evident in FIG. 2 that the reference voltage Vref2 is above that of Vref1.

By selecting the comparative voltages Vref1 or Vref2 accordingly, the internally or externally filtered average value signal V1(t) can be less than or can exceed the threshold value Vref2 depending upon the current lighting means output. However, it will always be below the reference threshold Vref2 of the second comparator K2. Accordingly, the output of the comparator K2, i.e. the signal C2(t) is always zero. Therefore, in the event that the half-bridge current V1(t) is detected, this signal does not change over the entire operating time period.

However, the reference voltage Vref1 is selected such that when the switch 4 is switched on (see signal OutL) the signal V1a(t) is above the threshold value Vref1, whereas when the switch 3 is switched on (signal OutH) it is below the threshold value. Therefore, owing to the fact that the control of the switch 3, 4 is switched on with a duty cycle of 50%, the signal V1(t) will be above the threshold value Vref1 for about 50% of the switching period t1 and will be below it accordingly for 50%.

If in the meantime the lamp output is above the desired value applied by the reference voltage Vref1, the duty cycle of the signal V1(t) will be over 50%, which means that the output of the duty cycle evaluation unit 13 will then go to logic high, whereby also the output of the OR-element will go to high (or 1). Accordingly, the half-bridge driver is then controlled for an incremental increase in the operating frequency of the half-bridge 2. By reason of the operation of the lighting means in the capacitive range, this represents an operating point of the lighting means further away from the resonance peak which effects a reduction in output.

However, if in the time average measured over a switching period T1, the signal V1(t) is more than 50% below the reference voltage Vref1, the frequency of the half-bridge is decreased, whereby the output of the lighting means 9 is increased during operation on the capacitive branch of the resonance curve.

It should be emphasized once again that the reference voltage Vref1 specifies the output desired value for the lighting means 9 in the event of the half-bridge current being detected. Accordingly, the voltage Vref2 specifies the output desired value in the event of the lamp current being detected (feedback as an actual value).

The voltages Vref1 or Vref2 can be specified as fixed ("fixed output"). However, they can also be adjustable e.g. externally in the sense of dimming signals, thus giving rise to a dimming operation.

Figure 3:
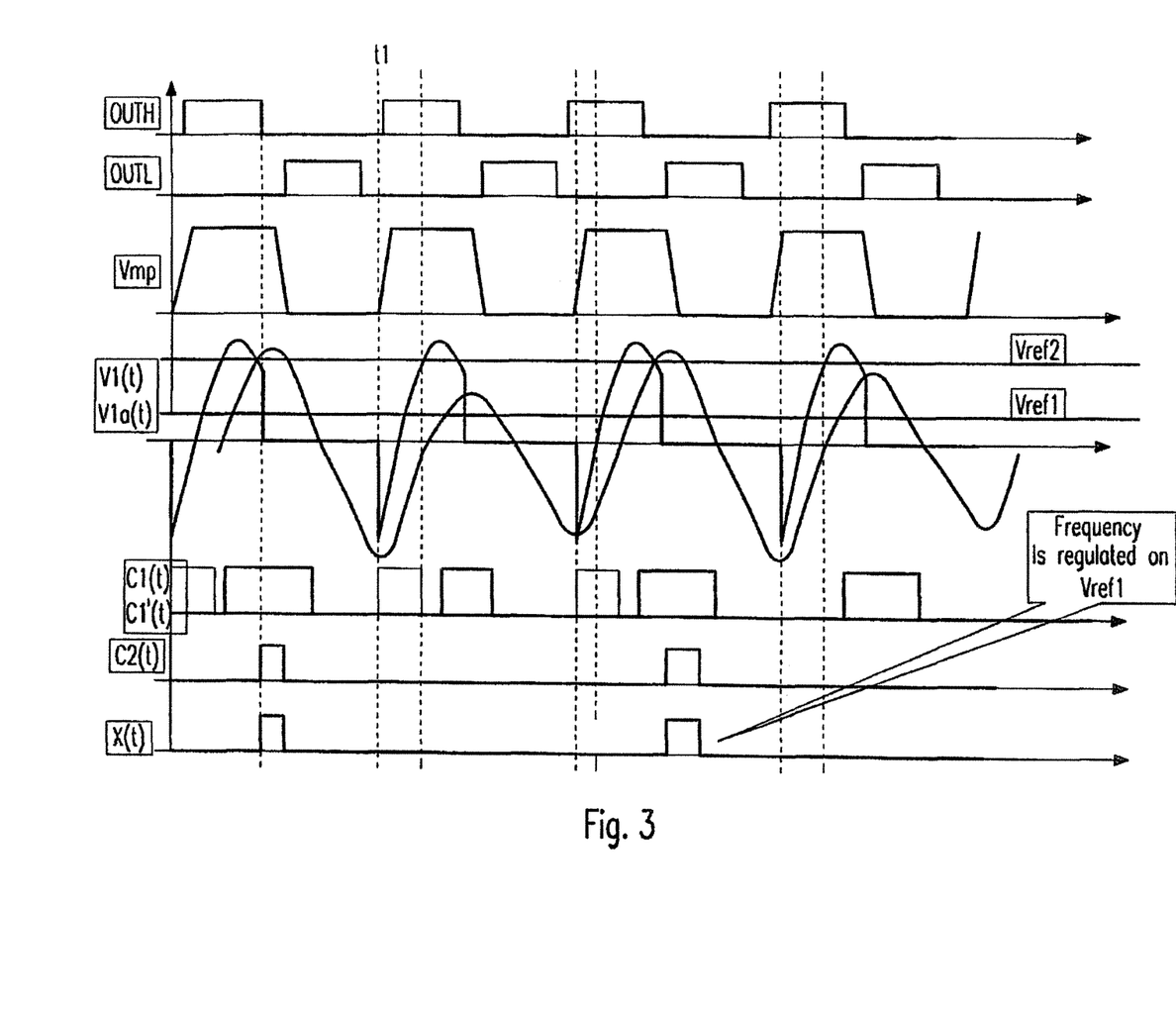
FIG. 3 shows signal progressions in the event that a signal which reproduces the lamp current is applied.

As illustrated in FIG. 3, in the event of a lamp current signal being fed back (which is not averaged with respect to time or low-pass filtered) the duty cycle of the comparison of this feedback signal with the reference voltage Vref1 will always be below 50%, so that in this case the duty cycle value evaluation unit 13 constantly outputs a signal C1(t)=0. Therefore, in the event of the lighting means current being detected, this first evaluation branch makes no contribution to the regulation, whereas in the event of the half-bridge current being detected, the second evaluation branch makes no contribution.

The increase or reduction in the operating frequency of the half-bridge 2 now depends merely upon how long the peak range of the current signal through the lighting means is above the threshold value Vref2.

Figure 6:
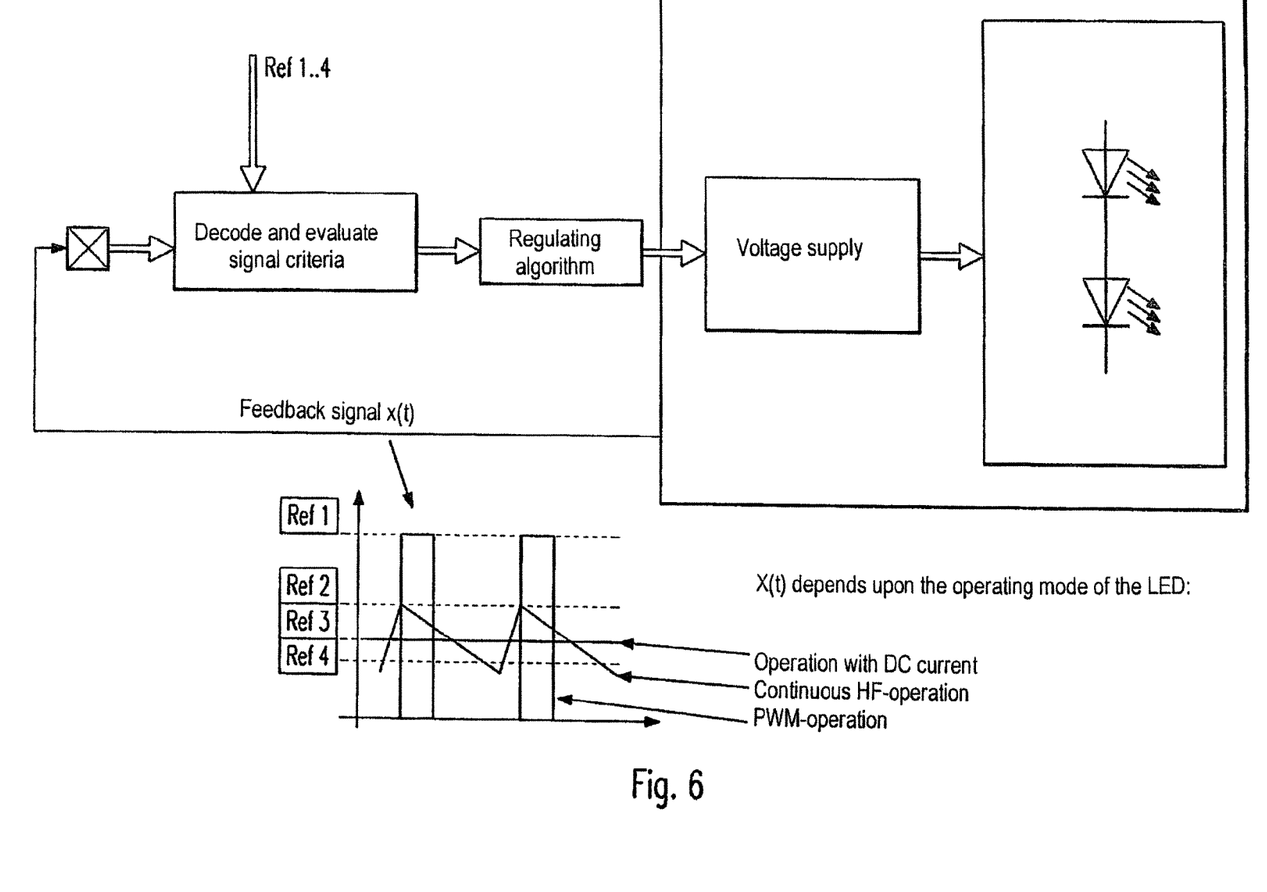
FIG. 6 shows the application of the invention to the control of light-emitting diodes (LEDs), wherein, in turn, a feedback signal is subjected to different sets of criteria in parallel, before it is supplied to the regulating algorithm as an actual value.

With reference to FIG. 6, an application of the invention to the regulated supply of voltage and/or current to light-emitting diodes (LEDs) will now be explained.

From the load circuit which comprises the light-emitting diodes, a feedback signal is applied, in turn, at an input of the control circuit. In turn, the feedback signal is "decoded" and evaluated in accordance with specified signal criteria, in this case threshold values (reference values (Ref1, Ref2, Ref3, Ref4)), before it is supplied as an actual value signal to a regulating module which implements a regulating algorithm. In dependence upon the supplied actual value signal and a desired value, the regulating module then outputs a control signal to a schematically illustrated voltage/current supply unit for the light-emitting diodes.

The platform idea in this application resides in the fact that the control unit is to be usable for different operating modes of the LEDs, without a priori information relating to the specifically implemented operating mode for the LEDs being supplied to the control unit.

For example, the following operating modes for the LEDs can be provided:
operation with DC current
continuous HF-operation
PWM-operation.

As schematically illustrated in FIG. 6, the feedback signal x(t) which can reproduce e.g. the diode current, will assume a different progression depending upon which of the three above-described permissible operating modes for the LEDs is actually implemented.

Figure 7:
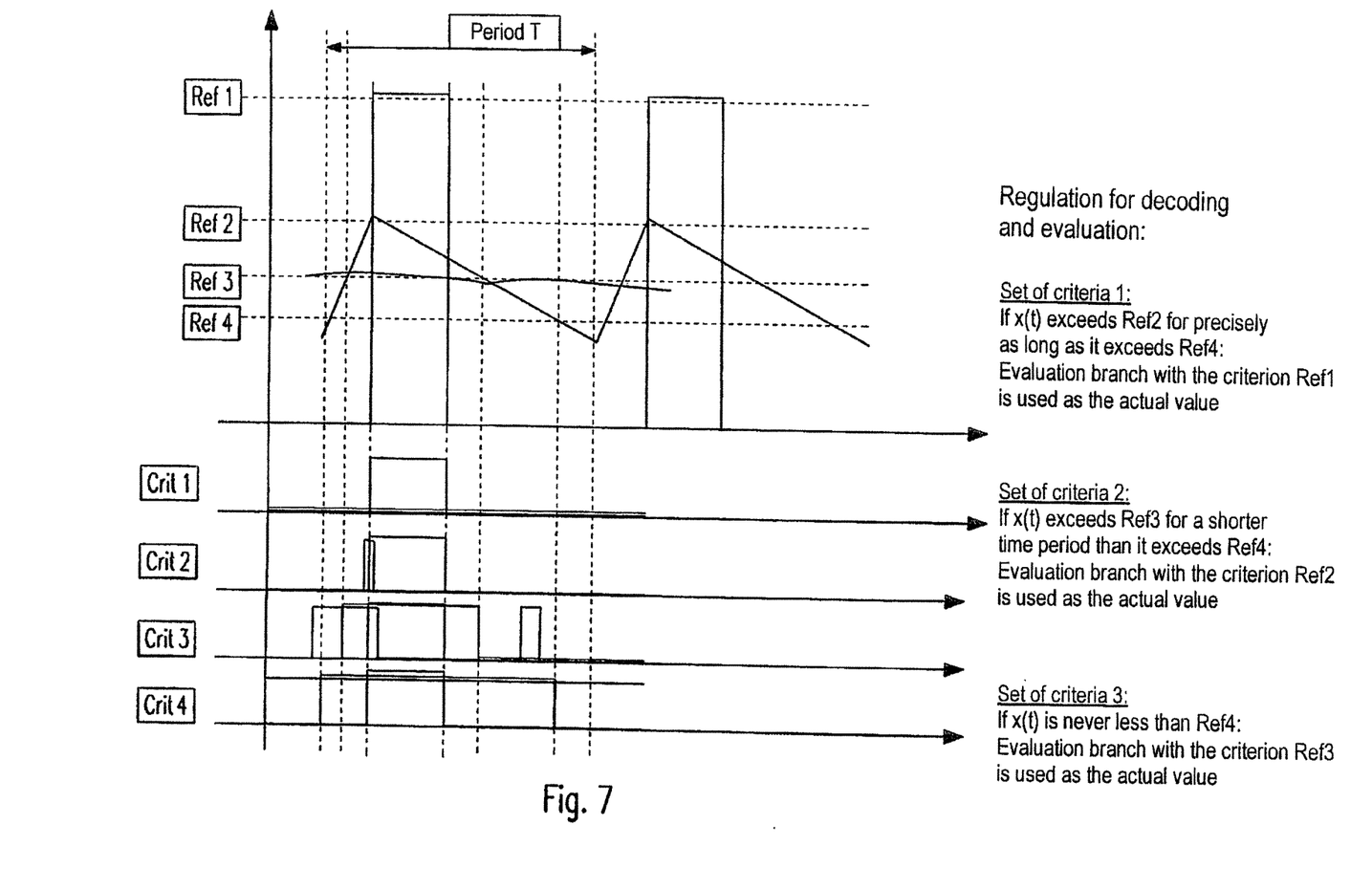
FIG. 7 shows an explanation of the signal decoding and evaluation of the feedback signal of FIG. 7.

The evaluation criteria in this example, see also FIG. 7, are defined by the different threshold values (reference values (Ref1–Ref4)). More specifically, see FIG. 7, there is an evaluation as to whether or how long the feedback signal x(t) exceeds or is less than specific threshold values. This evaluation is performed in each case within a period T of the switching control of a switch in the voltage/current supply unit for the light-emitting diodes.

In FIG. 7, three different sets of evaluation criteria are specified, which thus corresponds to three parallel evaluation branches.

If x(t) exceeds the threshold value Ref2 for precisely as long as it exceeds the threshold value R4, then it is suggested that a PWM-operation is connected to the output of the regulating module and accordingly the threshold value Ref1 is applied, i.e. an evaluation branch is used as the actual value signal feedback, in that the feedback signal x(t), always in relation to the switch period T, is compared with the threshold value Ref1.

If the feedback signal x(t) exceeds the threshold value Ref3 for a shorter time period than it exceeds the threshold Ref4, it is suggested that a continuous HF-operation of the light-emitting diodes is implemented. In this case, the evaluation branch which compares the feedback signal x(t) to the threshold value Ref2 is used for the actual value signal feedback.

A third set of criteria verifies whether the feedback signal x(t) is never less than the threshold value Ref4 during the switch period T. If this is the case, then it is suggested that the LEDs are being operated with DC current. In this case, an evaluation branch which compares the feedback signal x(t) to the threshold value Ref3 is used for the actual value signal feedback.

Figure 8:
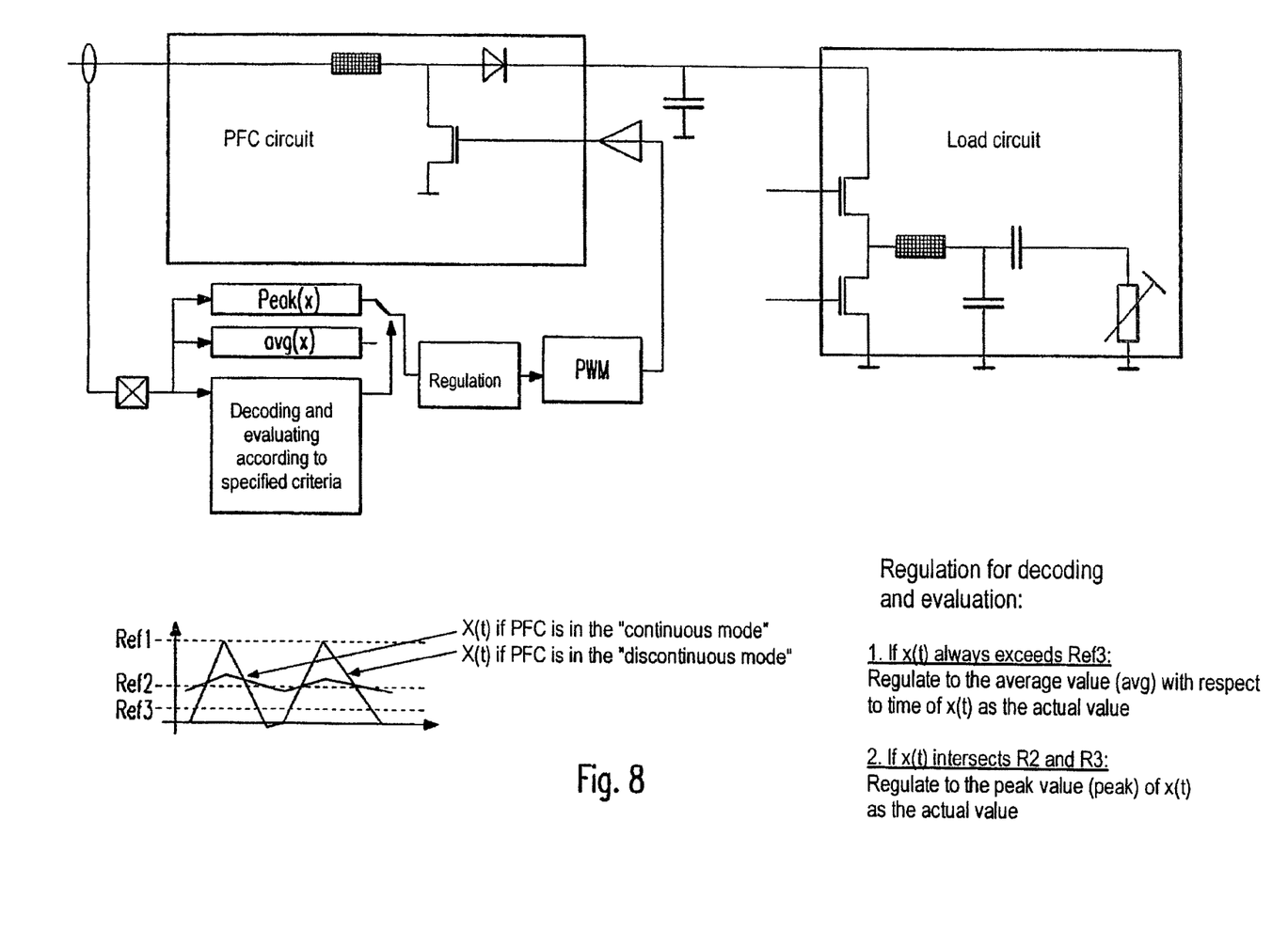
FIG. 8 shows the application of the present invention to a feedback signal of a PFC-circuit of an operating device for lighting means, wherein, in turn, this feedback signal is decoded and evaluated in accordance with specified criteria and parallel evaluation branches are provided.

With reference to FIG. 8, it shall now be explained that the present invention can be applied not only to load circuit regulation but also to feedback signals in other regions of an operating device for lighting means. In the example illustrated in FIG. 8, the feedback signal is a current signal of a PFC-circuit which is supplied with direct voltage and has an inductor, which is connected in series, and a diode, wherein in dependence upon a control of a switch the inductor is magnetized or demagnetized. On the output side, a storage capacitor is provided. The DC voltage which is stabilized by the storage capacitor can then be supplied, as illustrated, to the load circuit which can have e.g. a half-bridge circuit, whose centre point can be connected [to] a series resonance circuit having the lighting means, wherein the lighting means are schematically illustrated as a variable resistor.

In terms of a platform idea, the control and/or regulating unit in accordance with the invention should now be useable for different operating modes of the PFC-circuit, and in turn without any configuration information in relation to the specific operating mode of the PFC-circuit being supplied in advance to the control circuit.

In this example, the two fundamentally possible operating modes of the PFC-circuit are as follows:

"Continuous mode" of the PFC, i.e. the switch is switched on before the coil is fully demagnetized, so that the current through the coil never falls to zero.

"Discontinuous mode" of the PFC, i.e. waiting until the coil current has fallen to zero and where appropriate even slightly below this to a minimum value before the switch is then switched on. The so-called "borderline mode" can be subsumed under this "discontinuous mode" insofar as the switch is then switched on in the case of the "borderline mode" by the coil current immediately when the zero line is reached.

The control circuit in accordance with the present invention is then able to use the feedback signal (in this case: current through the coil of the PFC-circuit) to determine which operating mode of the PFC-circuit is actually applied.

For this purpose, it is determined on the one hand whether the feedback signal x(t) always exceeds a threshold value Ref3:

In this case, the presence of the "continuous mode" is suggested and the average value with respect to time of the feedback signal x(t) is supplied to the regulating module as the actual value.

However, if the feedback signal x(t) occasionally both exceeds and is less than the threshold values Ref2 and Ref3, it is suggested that the PFC-circuit is operating in the "discontinuous mode", in which case the peak value of the feedback signal x(t) is supplied to the regulating module as the actual value.

The invention claimed is:

1. Control circuit for an operating device for lighting means, comprising an output for outputting a control signal for the lighting means operation, and an input for a signal, wherein:
the input is internally connected to at least two parallel evaluation branches having outputs being supplied to a regulating module as an actual value signal feedback,
the regulating module uses this actual value signal feedback and a desired value to determine a control value and outputs it at the output of the control circuit as an actuating signal,
each of the parallel evaluation branches is designed for the purpose of performing an evaluation of the signal with the aid of different sets of criteria, and
the sets of criteria are selected in such a manner that only one set of criteria is continuously fulfilled for each permissible signal type of the input, so that only one evaluation branch makes a contribution which varies with respect to time to the actual value signal for the regulating module, whereas the other evaluation branches never make a contribution or continuously make a contribution which is constant with respect to time.

2. Control circuit as claimed in claim 1, wherein the criteria are selected from the following: amplitude, duty cycle in a defined period, frequency components, and the period of time during which at least one threshold value is not reached/is exceeded.

3. Control circuit as claimed in claim 1, wherein the control signal is designed for ON/OFF-control of a switch of the operating device.

4. Control circuit as claimed in claim 3, wherein the control signal is designed for controlling a switch of a power factor corrector (PFC), a switch regulator or an inverter of the operating device.

5. Control circuit as claimed in claim 1, wherein no information relating to the signal type applied at the input is provided in the control circuit.

6. Control circuit as claimed in claim 1, which is designed to determine an applied signal type adaptively and instantaneously.

7. Operating device for lighting means, comprising a control circuit as claimed in claim 1.

8. A light comprising a lighting means and an operating device as claimed in claim 7.

9. Operating device for lighting means selected from the group consisting of electronic ballast for gas-discharge lamps, high pressure lamps, and light-emitting diodes, comprising a control circuit as claimed in claim 1.

10. Control circuit for an operating device for lighting means, comprising an output for outputting a control signal for the lighting means operation, and an input for a signal, wherein:
the signal is processed internally in a serial manner in time division multiplexing and is then supplied to a regulating module as an actual value signal feedback,
in the time division multiplexing portions the signal is evaluated with the aid of different sets of criteria, and
the regulating module uses this actual value signal feedback and a desired value to determine a control value and outputs it at the output of the control circuit as an actuating signal.

11. Control circuit for an operating device for lighting means, comprising:
an output for the pulsing of switches of a half-bridge circuit with an adjustable frequency and/or duty cycle, wherein a load circuit which contains the lighting means can be connected to the half-bridge circuit, and
an input, to which optionally a signal that reproduces the current through the half-bridge, or a signal which reproduces the current through the lighting means can be supplied,
wherein the input is connected internally to two evaluation branches having outputs that are combined with a logic element having an output that is connected, in turn, to a control unit for adjusting the frequency of the half-bridge control signal, and wherein the input is configured to accept as the signal supplied to the input both the signal that reproduces the current through the half-bridge and the signal which reproduces the current through the lighting means, either simultaneously or alternately.

12. Control circuit as claimed in claim 11, wherein the two evaluation branches each have a comparator, and different reference voltages are supplied to the two comparators.

13. Control circuit as claimed in claim 11, wherein the logic element is an OR-element.

14. Control circuit as claimed in claim 11, which is designed as an application-specific integrated circuit (ASIC) and/or microcontroller.

15. Control circuit as claimed in claim 11, wherein:
the first evaluation branch is designed in such a manner that its output assumes two different logic states, when the signal that reproduces the half-bridge current is applied at the input, and
its output can only assume a constant logic value, if the signal that reproduces the current through the lighting means is applied.

16. Control circuit as claimed in claim 15, wherein the signal that reproduces the half-bridge current is low-pass filtered externally or in the control circuit.

17. Control circuit as claimed in claim 11, wherein the first evaluation branch has a comparator, whose output is connected to a duty cycle evaluation unit.

18. Control circuit as claimed in claim 11, wherein:
the second evaluation branch is designed in such a manner that its output assumes two different logic states, when the signal that reproduces the current through the lighting means is applied, and
its output can only assume a constant logic value, if the signal that reproduces the half-bridge current is applied at the input.

19. Control circuit as claimed in claim 11, wherein the second evaluation branch has a comparator, whose output is connected to the logic element.

20. Control circuit as claimed in claim 11, which is formed so as to increase or decrease the frequency of the half-bridge control signal preferably by one increment in dependence upon the logic output value of the logic element.

21. Integrated digital control circuit for an operating device for lighting means, comprising:
an output for the pulsing of switches of a half-bridge circuit with an adjustable frequency, wherein a load circuit that contains the lighting means can be connected to the half-bridge circuit, and
an input, to which optionally a signal that reproduces the current through the half-bridge, or a signal that reproduces the current through the lighting means can be supplied,
wherein the input branches internally into two evaluation branches which each have a comparator that provides output, in turn, to a control circuit for adjusting the frequency of the half-bridge circuit,
wherein the input is configured to accept as the signal supplied to the input both the signal that reproduces the current through the half-bridge and the signal which reproduces the current through the lighting means, either simultaneously or alternately, and
wherein different reference voltages are supplied to the two comparators.

22. Method for operating an operating device for lighting means by the output of an actuating signal, wherein:
a signal is supplied at an input,
the input is connected internally to at least two parallel evaluation branches, whose outputs, in turn, are combined and supplied to a regulating module as an actual value signal feedback,
a regulating module uses this actual value signal feedback and a desired value to determine a control value and outputs it at the output of the control circuit as an actuating signal, each of several parallel evaluation branches performs an evaluation of the same signal with the aid of different sets of criteria, and the sets of criteria are selected in such a manner that only one set of criteria is continuously fulfilled for each permissible signal type of the input, so that only one evaluation branch makes a contribution which varies with respect to time to the actual value signal for the regulating module, whereas the other evaluation branches never make a contribution or continuously make a contribution which is constant with respect to time.

23. Method as claimed in claim 22, wherein no information relating to the signal type applied at the input is provided in the control circuit.

24. Method as claimed in claim 22, wherein the signal type applied at the input is determined adaptively and instantaneously.

25. Method as claimed in claim 24, wherein the criteria are selected from the group consisting of amplitude, duty cycle in a defined period, and frequency components.

26. Application-specific integrated circuit (ASIC) that is formed for the implementation of a method as claimed in claim 22.

27. Method for optionally regulating the output of lighting means by an integrated digital control circuit that comprises:
   an output for the pulsing of switches of a half-bridge circuit with an adjustable frequency, wherein a load circuit that contains the lighting means is connected to the half-bridge circuit, and
   an input, to which optionally a signal which reproduces the current through the half-bridge, or a signal that reproduces the current through the lighting means can be supplied,
   wherein the signal applied at the input is supplied internally to two evaluation branches having outputs that are combined with a logic element, having an output that, in turn, is connected to a control unit for adjusting the frequency of the half-bridge control signal, and wherein the input is configured to accept as the signal supplied to the input both the signal that reproduces the current through the half-bridge and the signal which reproduces the current through the lighting means, either simultaneously or alternately.

28. Method for optionally regulating the output of lighting means by an integrated digital control circuit that comprises:
   an output for the pulsing of switches of a half-bridge circuit with an adjustable frequency, wherein a load circuit that contains the lighting means can be connected to the half-bridge circuit, and
   an input, to which optionally a signal that reproduces the current through the half-bridge, or a signal that reproduces the current through the lighting means can be supplied,
   wherein the signal applied at the input is supplied internally to two evaluation branches, each of which have a comparator that provides output, in turn, to a control circuit for adjusting the frequency of the half-bridge circuit,
   wherein the input is configured to accept as the signal supplied to the input both the signal that reproduces the current through the half-bridge and the signal which reproduces the current through the lighting means, either simultaneously or alternately, and
   wherein different reference voltages are supplied to the two comparators.

29. A non-transitory computer software program product, which implements a method as claimed in claim 28, when the computer software product runs in a computing unit.

* * * * *